United States Patent
Peterson et al.

(10) Patent No.: US 10,359,860 B2
(45) Date of Patent: Jul. 23, 2019

(54) BACKLIGHTING COLOR TEMPERATURE CONTROL APPARATUS

(71) Applicant: Rohinni, LLC, Coeur d' Alene, ID (US)

(72) Inventors: Cody Peterson, Hayden, ID (US); Andy Huska, Liberty Lake, WA (US)

(73) Assignee: Rohinni, LLC, Coeur d'Alene, ID (US)

( * ) Notice: Subject to any disclaimer, the term of this patent is extended or adjusted under 35 U.S.C. 154(b) by 76 days.

(21) Appl. No.: 15/681,211

(22) Filed: Aug. 18, 2017

(65) Prior Publication Data

US 2018/0052524 A1    Feb. 22, 2018

Related U.S. Application Data

(60) Provisional application No. 62/376,751, filed on Aug. 18, 2016.

(51) Int. Cl.
*G06F 3/02* (2006.01)
*H01H 13/70* (2006.01)
*F21V 8/00* (2006.01)

(52) U.S. Cl.
CPC .......... *G06F 3/0202* (2013.01); *G02B 6/0068* (2013.01); *H01H 13/70* (2013.01)

(58) Field of Classification Search
CPC ............ G09G 2320/0666; G09G 5/006; G06F 3/0202
See application file for complete search history.

(56) References Cited

U.S. PATENT DOCUMENTS

| | | | |
|---|---|---|---|
| 2005/0117357 A1* | 6/2005 | Ishii | H01L 33/44 362/458 |
| 2007/0139923 A1 | 6/2007 | Negley et al. | |
| 2007/0147932 A1* | 6/2007 | Giles | G06F 3/0219 400/472 |
| 2007/0258243 A1 | 11/2007 | Segall | |
| 2008/0212307 A1 | 9/2008 | Chan et al. | |
| 2009/0002604 A1* | 1/2009 | Morimoto | F21V 23/00 349/71 |

(Continued)

FOREIGN PATENT DOCUMENTS

| | | | | |
|---|---|---|---|---|
| CN | 202834974 | | 3/2013 | |
| CN | 204166488 U | * | 2/2015 | ............... G06F 3/02 |
| EP | 2717337 | | 4/2014 | |

OTHER PUBLICATIONS

PCT Search Report and Written Opinion dated Nov. 30, 2017 for PCT Application No. PCT/US17/47661, 8 pages.

*Primary Examiner* — Priyank J Shah
(74) *Attorney, Agent, or Firm* — Lee & Hayes, P.C.

(57) ABSTRACT

An apparatus includes a housing including a plurality of light sources to provide backlighting for the apparatus. A first portion of the plurality of light sources is configured to provide a first color temperature setting. A second portion of the plurality of light sources is configured to provide a second color temperature setting. The apparatus includes a controller including one or more processors configured to execute instructions stored on memory, which when executed, cause the one or more controllers to set at least one of an overall color temperature setting for the backlighting of the apparatus, or a partial color temperature setting for the backlighting of the apparatus.

16 Claims, 2 Drawing Sheets

(56) References Cited

U.S. PATENT DOCUMENTS

| | | | |
|---|---|---|---|
| 2014/0028565 A1* | 1/2014 | Gueorguiev | G06F 1/1662 345/168 |
| 2014/0304430 A1* | 10/2014 | Salley | G06F 13/102 710/10 |
| 2015/0080051 A1 | 3/2015 | Yamazaki et al. | |
| 2016/0293811 A1* | 10/2016 | Hussell | H01L 25/0753 |

* cited by examiner

BACKLIGHTING COLOR TEMPERATURE CONTROL APPARATUS

CROSS REFERENCE TO RELATED PATENT APPLICATIONS

This application is a continuation of, and claims priority to, U.S. Provisional Patent Application No. 62/376,751, filed Aug. 18, 2016, incorporated herein by reference. This application incorporates U.S. patent application Ser. No. 14/939,896, filed on Nov. 12, 2015, entitled "Method and Apparatus for Transfer of Semiconductor Devices," in its entirety by reference.

BACKGROUND

Light-emitting diode (LED) technology provides a lighting means that consumes less energy and is more physically robust, smaller, faster-switching, and longer lasting than previous lighting elements. However, the size, functionality, and configuration of conventional LEDs have constrained the use of LEDs to particular applications. One such application is the use of LEDs for backlighting devices.

In an apparatus having backlighting, it may be desirable to adjust the appearance of the backlighting to be compatible with different lighting scenarios in the environment external to the apparatus. This adjustment of the appearance of the backlighting refers to the color temperature of the light. With respect to the use of LEDs, since LEDs emit light primarily by processes other than thermal radiation, the emitted radiation does not follow the form of a black-body spectrum. As such, LEDs are assigned a correlated color temperature (CCT). CCT is the color temperature of a black-body radiator, which, to human color perception, most closely matches the light from the lamp. Currently, CCT dimming for LED technology is regarded as a difficult task, since binning, age and temperature drift effects of LEDs change the actual color value output. Thus, feedback loop systems are used (for example with color sensors) to actively monitor and control the color output of multiple color mixing LEDs.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Overview

Figure 1:
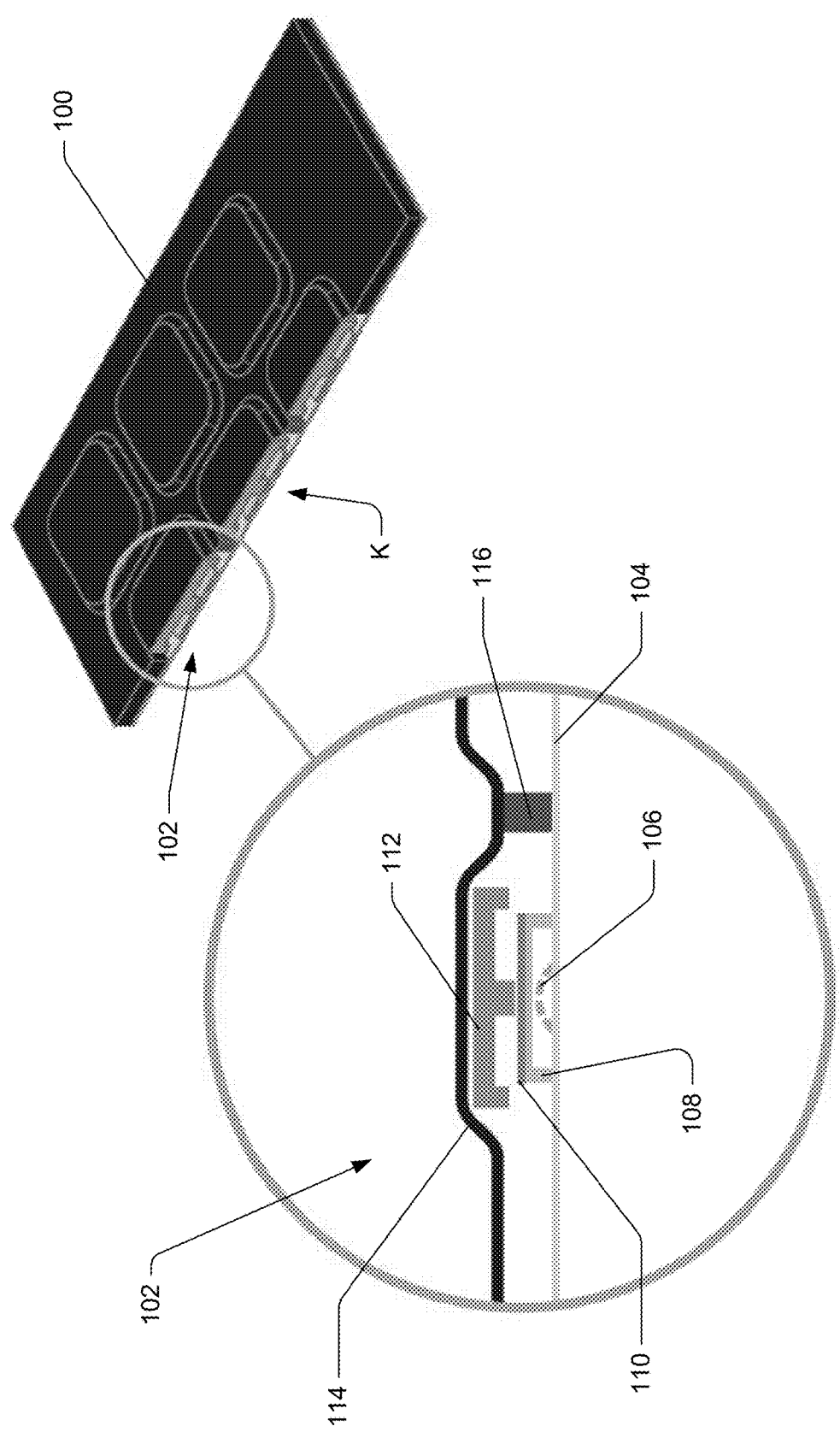
FIG. 1 illustrates a cross-sectional view of a keyboard key assembly according to embodiments of the instant application.

This disclosure is directed generally to backlighting in an apparatus. In many instances, the backlighting illuminates an image, symbol, character, or other design in a surface cover of the apparatus. In some instances, the features of this disclosure are described with respect to illumination of a legend (e.g., an image, symbol, character, or other design) on a key(s) of a keyboard. In general, backlighting may be achieved via one or more unpackaged, micro-sized LEDs disposed behind the surface of the cover from a first-person perspective view, which means that the surface of the cover and/or legend (e.g., symbol, character, design, etc.) on the surface, if one exists, is illuminated from a light source located behind the surface of the cover such that the light of the light source diffuses through the surface of the cover in a direction toward the individual looking at the surface of the cover. For example, the light sources for lighting the keys on a keyboard are behind the cover of the keys from the perspective of an individual looking at the key(s) of the keyboard. Moreover, in an instance where the backlit apparatus is not a keyboard, the light source is similarly hidden from the direct view of the individual looking at the apparatus.

As indicated above, other implementations of the features described herein are contemplated. For example, the features described herein may be implemented in the illumination of the cover of other apparatuses including apparel, displays, banners, flags, décor, signs, toys, keypads, electronics, etc. Furthermore, the concepts and designs of the features described herein as they relate to illumination of keys of a keyboard having various layers of lighting may, in many instances, be similarly applied to the illumination of other apparatuses.

Techniques and systems described herein may be implemented in a number of ways. Example implementations are provided below with reference to the following figures. The implementations, examples, and illustrations described herein may be combined. The term "techniques," for instance, may refer to system(s), method(s), computer-readable media/instructions, module(s), algorithms, hardware logic (e.g., Field-programmable Gate Arrays (FPGAs), Application-Specific Integrated Circuits (ASICs), Application-Specific Standard Products (ASSPs), System-on-a-chip systems (SOCs), Complex Programmable Logic Devices (CPLDs)), and/or technique(s) as permitted by the context described above and throughout the document.

This disclosure describes techniques and products that are well-suited to lighting using unpackaged LEDs. However, the same techniques and products may also implement lighting with packaged LEDs. For consistency, the use of the term LED herein, may generally indicate an unpackaged LED. An "unpackaged" LED refers to an unenclosed LED without protective features. For example, an unpackaged LED may refer to an LED die that does not include a plastic or ceramic enclosure, pins/wires connected to die contacts (e.g., for interfacing/interconnecting with ultimate circuitry), and/or a sealing (e.g., to protect the die from the environment).

In many instances, the techniques discussed herein are implemented at the assembly level (after LEDs are disposed on a "circuit substrate"). The term "circuit substrate" and/or alternatively, "substrate," may include, but is not limited to: a paper, glass, or polymer substrate formed as a sheet or other non-planar shape, where the polymer—translucent or otherwise—may be selected from any suitable polymers, including, but not limited to, a silicone, an acrylic, a polyester, a polycarbonate, etc.; a circuit board (such as a printed circuit board (PCB)); a string or thread circuit, which may include a pair of conductive wires or "threads" extending in parallel; and a cloth material of cotton, nylon, rayon, leather, etc. The use of either term "circuit substrate" or "substrate" does not necessarily mean that a circuit or circuit trace has yet been added to the substrate. As such, the lighting apparatus may implement a variety of substrates, with or without a circuit, as described herein.

The choice of material of the substrates, as discussed herein, may include durable materials, flexible materials, rigid materials, and/or other materials which maintain suitability for the end use of the product. Further, a substrate, such as a circuit substrate, may be formed solely or at least partially of conductive material such that the substrate acts as a conductive circuit for providing electricity to an LED. In an example, a product substrate may be a flexible, translucent polyester sheet having a desired circuit pattern screen printed thereon using a silver-based conductive ink material to form a circuit trace. In some instances, the thickness of the product substrate may be range from about 5 microns to about 80 microns, about 10 microns to about 80 microns, about 10 microns to about 100 microns, and in some instances, the thickness may be less than or greater than the above ranges.

Any suitable type of technology can be utilized to implement conductive traces. Examples of suitable technologies include, by way of example and not limitation: silver, carbon-like material, or any other material for conducting electricity. The conductive traces may be composed of material that is reflective, opaque, or otherwise not translucent nor transparent. In some examples, the conductive traces may be translucent or transparent (e.g., by using indium tin oxide). The conductive traces may include conductive nano-fibers. Conductive traces may be created using conventional conductive ink or other similar processes. Conductive inks may be classed as fired high solids systems or PTF (polymer thick film) systems that allow circuits to be drawn or printed on a variety of substrate materials such as polyester to paper. These types of materials usually contain conductive materials such as powdered or flaked silver and carbon like materials. While conductive inks can be an economical way to lay down a modern conductive traces, traditional industrial standards such as etching of conductive traces may be used on relevant substrates. In yet another example, conductive traces may be premade similarly to photo-etched copper and can have a secondary conductive bond material (e.g., solder) applied to the premade conductive trace to facilitate attachment.

Further, in the embodiments discussed herein, it is contemplated that the circuit substrates containing LEDs may be prepared using a "direct transfer" process as described in U.S. patent application Ser. No. 14/939,896 (incorporated by reference herein in its entirety), where an unpackaged LED die is transferred from a wafer or wafer tape directly to a substrate, such as a circuit substrate, and then implemented into an apparatus at assembly, with or without further processing, such as the addition of a phosphor or other down-converting media such as quantum dots or organic dyes. The direct transfer of the unpackaged LED die may significantly reduce the thickness of an end product (in comparison to other techniques), as well as the amount of time and/or cost to manufacture the product substrate. Although in other instances, the techniques may be implemented in other contexts that do not implement a direct transfer process for the LED dies.

The fabrication of LEDs typically involves an intricate manufacturing process with a myriad of steps. The fabrication may start with handling a semiconductor wafer. The wafer is diced into a multitude of unpackaged LEDs. An unpackaged LED device may be referred to as an LED die, or just a "die." A single semiconductor wafer may be diced to create multiple dies of various sizes, so as to form upwards of more than 100,000 or even 1,000,000 dies from the semiconductor wafer. For conventional usage, unpackaged dies are then generally "packaged." The "packaged" modifier refers to the enclosure and protective features built into a final LED as well as the interface that enables the die in the package to ultimately be incorporated into a circuit. For example, as referenced above, packaging may involve mounting a die into a plastic-molded lead frame or onto a ceramic substrate, connecting the die contacts to pins/wires for interfacing/interconnecting with ultimate circuitry, and sealing the die with an encapsulant to improve light extraction and protect it from the environment (e.g., dust). Due to the packaging, the LED dies are ready to be "plugged in" to the circuit assembly of the product being manufactured. A product manufacturer then places packaged LEDs in product circuitry. Additionally, while the packaging of on an LED die protects the die from elements that might degrade or destroy the LED device, packaged LED dies are inherently larger (e.g., in some cases, around 10 times the thickness and 10 times the area, resulting in 100 times the volume) than the die found inside the package. Thus, the resulting circuit assembly cannot be any thinner than the packaging of the LED die and the circuit substrate.

While embodiments are described herein in language specific to structural features and/or methodological acts, it is to be understood that the disclosure is not necessarily limited to the specific features or acts described. Rather, the specific features and acts are disclosed herein as illustrative forms of implementing the embodiments.

Illustrative Embodiments of Backlighting

Many apparatuses include backlighting. The result of backlighting from an apparatus that appears suitable when used/placed in one environment may not appear suitable with the same apparatus when used/placed in another environment. For example, a particular color temperature setting used to backlight the keys on a keyboard of a portable laptop computer may appear suitable or comfortable to the eyes of a user of the laptop when used in a brightly lit office space. However, when the laptop is used in a darkened room, the same setting that was used in the office space may be inadequate, uncomfortable, or too stimulating, if, for example, the user is trying to relax. Thus, because a user's preferences and the environment(s) in which an apparatus is used may vary widely, it is desirable to have the ability to individually select and/or customize a specific color temperature setting for different environments, and/or have the apparatus automatically adapt to different environments. In the instance where the apparatus automatically adapts to the environment, the apparatus may include a sensor to detect the lighting of the environment.

Accordingly, a state of the backlighting with respect to the compatibility or suitability for the environment may be altered. This alteration may be generically predetermined and preset on a device to perform at a generic setting based on a variety of users, in one or more different environments. Additionally, and/or alternatively, the state of the backlighting may be customizable according to the preferences of an individual user and desired settings for one or more different environments.

In an embodiment, the state of the backlighting may be altered by adjusting the overall output of one or more light sources disposed in an apparatus. The "overall output" of one or more light sources in a device may be understood to mean the resultant lighting effect achieved by varying parameters of the light source(s). Parameters of the light source(s) that may be varied may include: brightness, color, intensity, on/off state, etc.

In some instances, adjustable factors of the one or more light sources that affect the parameters discussed above may include: the quantity of light sources that are illuminated at the same time; the amount of power being provided to one or more of the light sources; illumination of one or more light sources based on position in the apparatus, either with respect to the lateral distribution across a length or width of an apparatus, or with respect to the vertical distribution (height) of the apparatus, where more than one light source may be located at substantially the same position laterally, but the one or more light sources are disposed on separate layers at different heights in the apparatus; selective positioning of one or more of the light sources that are manufactured with predetermined varying amounts and/or colors of phosphor; illumination of particular groupings of light sources positioned at predetermined locations so as to uniformly affect the overall output and appearance; etc. Further, the state of the backlighting may be altered by using a combination of any of the factors above.

FIG. 1 shows an example embodiment of an apparatus in which backlighting may be implemented, namely a keyboard. The cross-section of an individual key represents layers that occur repeatedly across the entire keyboard so as to indicate the varying height levels on which an LED may be positioned throughout the keyboard. Likewise, this same concept of layering may be applied to other devices that implement backlighting.

In FIG. 1, a perspective view of a cross-section of a backlit keyboard 100 is depicted. Further, emphasis of a cross-sectional side view of a single key 102 of the keyboard 100 is provided. Specific elements of the structure of the key 102 include a base 104 that may include electronic circuitry elements (not shown) to interact and power aspects of the keyboard 100. Thus, the base 104 may serve as a foundation to support the structure of the key 102 thereon. The key 102 may further include a dome 106, a dome cage 108, a dome cover sheet 110, a key stiffener 112, and a cover 114.

The dome 106 functions as the sensory contact terminal. The dome 106 may be surrounded, or fenced in, at the sides thereof by the framed dome cage 108. For example, in some instances, the dome cage 108 may have a rectangular shape, or circular shape, or other shape having a plurality of sides that are connected to form a closed shape so that the dome 106 is surrounded or enclosed on all lateral sides of the dome 106. The dome cage 108 may be a sturdy material that is structurally firm to provide protection from damage to the dome 106. The dome cage 108 may be formed as a shaped frame resting on short leg posts (see FIG. 2) and is open at the top side thereof to allow a force to be applied to the top of the dome 106. Alternatively, sides of the dome cage 108 may be consistent in height at a side and all the way around the dome 106, so as to be like a solid wall. However, the dome cover sheet 110 may be placed over the open top of the dome cage 108 so as to cover the dome 106, and thereby prevent direct contact between the dome 106 and the key stiffener 112. Additionally, the key stiffener 112 is covered by the cover 114, and the barrier between key 102 and an adjacent key (K) may be supported by a frame 116.

Due to the micro-size of the light sources used in this application, there are many locations where the light sources, such as unpackaged LEDs measuring between about 2 microns to about 25 microns, or from about 25 microns to about 50 microns, or from about 50 microns to about 100 microns, or larger or smaller, may be disposed. Additionally, as described in U.S. application Ser. No. 14/939,896, the light sources may be electrically powered and connected via a thin conductive trace disposed on the components of the apparatus. Thus, several layouts are possible. In the following description of the exploded cross-section 200 of key 102 in FIG. 2, the use of the term "light source" (whether or not preceded by "a") may indicate one or more light sources. Furthermore, it is contemplated that any one or a combination of more than one of the following descriptions of light source layouts may be implemented according to a desired strength of backlighting the apparatus. As such, the descriptive statement of a layout where the base 104 of key 102 may have a light source 202 disposed thereon and positioned to be under the dome 106, indicates that the block identified by reference numeral 202 may be a single light source or may represent a plurality of light sources, all of which are contained somewhere within a perimeter defined by an outer periphery of the dome 106. Accordingly, while the light source 202 is depicted in the center of the dome, the light source(s) 202 may actually be off center and distributed beneath the dome where the light source(s) 202 will not interfere with the electrical contact between the dome 106 and electronic circuitry on the base 104 when force is applied to the cover 114.

Additional potential light source layouts may include the following: a light source 204 on the base 104 in between the dome 106 and the dome cage 108; a light source 206 on the base 104 around the outside of the dome cage 108; a light source 208 embedded in the dome cage 108; a light source 210 disposed on the dome cage 208; a light source 212 disposed on the dome cover sheet 110; a light source 214 disposed underneath the key stiffener 112; a light source 216 disposed on the key stiffener 112; and/or a light source 218 disposed directly on an underside of the cover 114. In the above case, where more than one of the light sources 204-218 are implemented, the individual light sources or groups of light sources may be referred to as a first light source, a second light source, a third light source, and so on. In one instance, a series of light sources may be disposed directly aligned with the shape of the legend on or under the cover 114. It is noted that while the above description of potential light source layouts describes the light sources (202-218) as being "under," "in," "around," "on," "embedded," or "underneath" various components, it is further contemplated by the inventors that the light sources may be disposed in various other manners with respect to each of the individual components. That is, for example, where a light source is described as being "on" a component, the light source may alternatively, or additionally, be "embedded in," "underneath," "in," etc. the component where possible.

In connection with the above descriptions of potential light source layouts, multiple embodiments of phosphor application (for light emission modification) are contemplated. In general, phosphor may be applied to modify the color and dispersion of the light emitted from the light sources. Thus, the phosphor may be applied in or on components, or portions of those components, through which light may shine. In some instances, phosphor may be applied directly onto one or more of the light source(s)

202-218 and/or on or mixed into the material of the dome cage 108, the dome cover sheet 110, the key stiffener 112, or the cover 114. For example, phosphor may be applied (not shown explicitly) to an upper surface of one or more sides of the dome cage 108, and a light source, such as one or more unpackaged LEDs, may be connected to a thin circuit on the base and aligned directly beneath the one or more sides of the dome cage 108.

Figure 2:
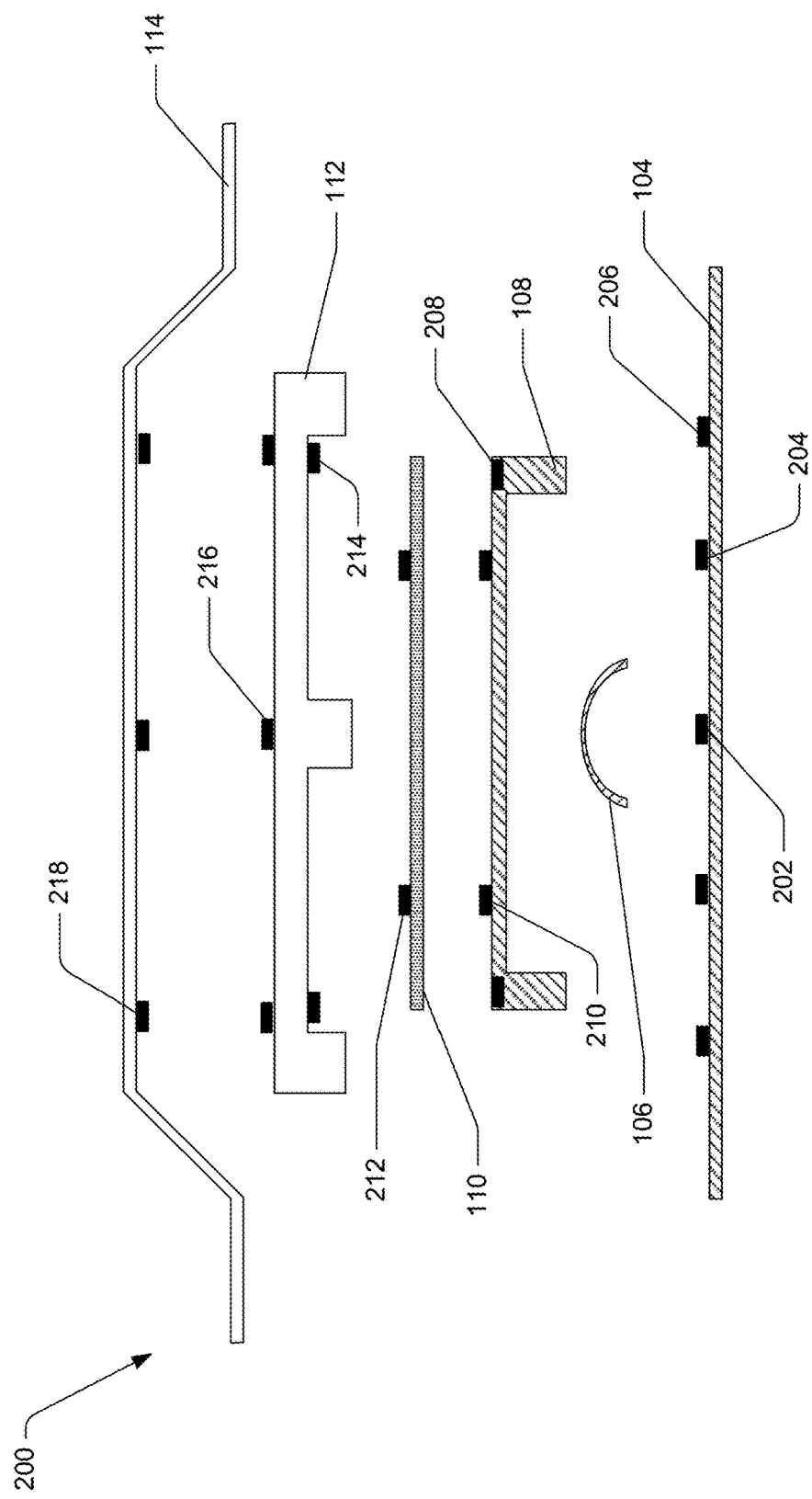
FIG. 2 illustrates an exploded cross-sectional view of a keyboard key assembly according to embodiments of the instant application.

With respect to FIG. 2, as indicated previously, each block representing light sources 202-218 may include one or more light sources forming a group or cluster of light sources. Within a group or cluster of light sources, each light source may be individually addressable or an entirety of the group may be addressable as a group. Furthermore, within a group of light sources, the amount/color of phosphor disposed on each light source may vary to produce a range of different color temperature states from warm white to cool white, such as daylight color temperature. As such, the color temperature of the backlighting may be adjusted in many ways.

In an example embodiment, a group or cluster of light sources may include: a first source that emits a warm white light, a second source that emits a neutral white light, and a third source that emits a cool white light. To adjust the overall output of the backlighting to a neutral white light, one or more of the second sources in the respective groups of light sources disposed throughout the apparatus may be illuminated. Additionally, and/or alternatively, a mixture of first, second, and/or third sources may be illuminated to make a customized backlighting color temperature setting.

In another example embodiment, a particular color temperature setting may be selected (e.g., manually or automatically adjusted upon receipt of a signal to a processor generated by a sensor) by illuminating the light source(s) located in a same relative location across the apparatus. For example, in a keyboard, a processor may activate the light source(s) 218 in one or more keys across the keyboard, because the location of the light source(s) 218 against cover 114 may produce a particular color temperature due to blockage/transparency by cover 114 or other features of the keyboard or due to the amount/type of phosphor associated with the light source(s) 218. Additionally, and/or alternatively, the processor may instead activate the light source(s) 212 (or 202, 204, 206, 208, 210, 214, 216, etc.) in one or more keys across the keyboard based on similar reasoning as explained above.

Moreover, in an embodiment, a user may select only a portion of an entirety of the apparatus to emit backlighting. Additionally, and/or alternatively, the user may select a portion of the entirety of the apparatus to emit a first color temperature, and select a remaining portion of the apparatus (or a portion of the portion) to emit a second color temperature. The first color temperature and the second color temperature may be different constantly, or according to a predetermined setting. For example, at a particular time of the day or in a particular environmental lighting atmosphere, a user may desire that the alphabetic keys of a keyboard are backlit with a first color temperature and the numeric keypad of the keyboard are backlit with a second distinct color temperature. Then, at a different particular time of the day or in a different particular environmental lighting atmosphere, a user may desire that the alphabetic keys of a keyboard are backlit with a different first color temperature and the numeric keypad of the keyboard are backlit with a different second distinct color temperature. Likewise, the entirety of the apparatus may be divided into a plurality of portions greater than two, each portion being individually capable of emitting a desired backlighting color temperature.

The settings for the various embodiments described above may be configured via interaction with a controller having a programmable command function stored on memory and implemented as instructions executed by one or more processors according to the functionality of the apparatus being backlit. The execution of the instructions may be triggered either manually or automatically based on a sensor or a timed schedule.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "may" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:
1. An apparatus, comprising:
   a keyboard having at least letter keys and number keys, each key of the letter keys and number keys including a base, a dome, a dome cage, a dome cover sheet, a key stiffener, and a cover;

a housing including a plurality of light sources to provide backlighting for the keyboard, a first portion of the plurality of light sources being configured to provide a first color temperature setting and a second portion of the plurality of light sources being configured to provide a second color temperature setting, and respective light sources of the plurality of light sources being distributed among the letter keys and the number keys and are disposed, respectively, with one of the base, the dome cage, the dome cover sheet, or the key stiffener; and a controller including one or more processors configured to execute instructions stored on memory, which when executed, cause the plurality of light sources to:
set the first color temperature setting for the letter keys, and
set the second color temperature setting for the number keys.

2. The apparatus according to claim 1, wherein the plurality of light sources are disposed on a circuit of the apparatus via direct transfer from a die wafer to respective circuit traces that electrically connect the plurality of light sources to be controlled via the controller.

3. The apparatus according to claim 1, wherein the plurality of light sources are arranged in groups including two or more light sources, at least a first light source of the two or more light sources being configured to provide the first color temperature setting, and at least a second light source of the two or more light sources being configured to provide the second color temperature setting.

4. The apparatus according to claim 3, wherein the first light source of the two or more light sources includes a first phosphor characteristic and the second light source of the two or more light sources includes a second phosphor characteristic that is different than the first phosphor characteristic.

5. The apparatus according to claim 3, wherein the first phosphor characteristic and the second phosphor characteristic relate to an amount of phosphor placed on the respective first light source and second light source.

6. The apparatus according to claim 3, wherein the first phosphor characteristic and the second phosphor characteristic relate to a color of phosphor placed on the respective first light source and second light source.

7. The apparatus according to claim 1, further comprising an ambient light sensor,
wherein, when the plurality of light sources set the overall color temperature setting, the plurality of light sources automatically adjust the overall color temperature to a predetermined setting upon detection by the sensor of a change in ambient light.

8. The apparatus according to claim 7, wherein the predetermined setting is configured manually by a user.

9. A keyboard configured for variable backlighting, comprising:
at least letter keys and number keys, each key of the letter keys and number keys including a base, a dome, a dome cage, a dome cover sheet, a key stiffener, and a cover;
a plurality of light sources disposed on a circuit configured to provide the backlighting, a first portion of the plurality of light sources being configured to emit light of a first color temperature, a second portion of the plurality of light sources being configured to emit light of a second color temperature different than the first color temperature, and respective light sources of the plurality of light sources being distributed among the letter keys and the number keys and being disposed, respectively, with one of the base, the dome cage, the dome cover sheet, or the key stiffener; and a controller configured to:
control power to the plurality of light sources, respectively, to thereby provide a first color temperature setting for application to the letter keys, and
control the power to the plurality of light sources, respectively, to thereby provide a second color temperature setting for application to the number keys.

10. The apparatus according to claim 9, wherein respective light sources of the first portion of the plurality of light sources have a first phosphor characteristic thereon, and
wherein respective light sources of the second portion of the plurality of light sources have a second phosphor characteristic thereon that is different than the first phosphor characteristic.

11. The apparatus according to claim 10, wherein the first phosphor characteristic and the second phosphor characteristic relate to an amount of phosphor placed on the respective light sources of the first portion of the plurality of light sources and respective light sources of the second portion of the plurality of light sources.

12. The apparatus according to claim 10, wherein the first phosphor characteristic and the second phosphor characteristic relate to a color of phosphor placed on the respective light sources of the first portion of the plurality of light sources and respective light sources of the second portion of the plurality of light sources.

13. The apparatus according to claim 9, wherein the controller is further configured to control a plurality of groups of light sources of the plurality of light sources, whereby individual groups of light sources are independently addressable.

14. The apparatus according to claim 13, wherein a group of light sources includes a first light source having a first amount of phosphor thereon and a second light source having a second amount of phosphor thereon.

15. The apparatus according to claim 9, wherein the controller is further configured to control the plurality of light sources to provide the color temperature setting for at an entirety of the apparatus, and
wherein the color temperature setting is variable for different portions of the apparatus.

16. An apparatus, comprising:
a keyboard having at least letter keys and number keys, each key of the letter keys and number keys including a base, a dome, a dome cage, a dome cover sheet, a key stiffener, and a cover;
a plurality of light sources to provide backlighting, respective light sources of the plurality of light sources are distributed among the letter keys and the number keys and are disposed, respectively, with one of the base, the dome cage, the dome cover sheet, or the key stiffener; and
a controller configured to control the plurality of light sources as addressable independently, in dispersed groups, and/or in adjacent groups to:
set a first color temperature setting for the letter keys, and
set a second color temperature setting for the number keys,
wherein a first portion of the plurality of light sources has a first phosphor thereon and is actuatable by the controller to provide the color temperature setting as the first color temperature setting, and a second portion of the plurality of light sources has a second phosphor thereon and is actuatable by the controller to provide the color temperature setting as the second color temperature setting, and wherein the first and second color temperature settings are manually determined by a user.

\* \* \* \* \*